United States Patent

Edlinger

[19]

[11] Patent Number: 5,993,510
[45] Date of Patent: Nov. 30, 1999

[54] PROCESS FOR WORKING UP COMBUSTION RESIDUES

[75] Inventor: Alfred Edlinger, Baden, Switzerland

[73] Assignee: "Holderbank" Financiere Glarus AG, Glarus, Switzerland

[21] Appl. No.: 08/929,459

[22] Filed: Sep. 15, 1997

[30]     Foreign Application Priority Data

Sep. 17, 1996 [AT] Austria ........................... GM 548/96 U

[51] Int. Cl.⁶ ............................................... C21B 11/00
[52] U.S. Cl. ................... 75/414; 75/501; 75/961
[58] Field of Search ................ 75/414, 501, 961

[56]              References Cited

U.S. PATENT DOCUMENTS 5,431,710   7/1995   Ebenfelt .................................. 75/501
5,776,226   7/1998   Edlinger .................................. 75/500

FOREIGN PATENT DOCUMENTS 394732   6/1992   Austria .
2159137  4/1996   Canada .
707083   4/1996   European Pat. Off. .

*Primary Examiner*—Melvyn Andrews
*Attorney, Agent, or Firm*—Pillsbury Madison & Sutro LLP

[57]              ABSTRACT

A process is disclosed for working up combustion residues or slags from waste incineration plants or steel works slags in a converter by reacting the molten slag with a metal bath while injecting carbon and oxygen into the metal bath. The converter is subdivided into three adjacent openly communicating zones. An afterburning zone including at least one lance for afterburning directed onto the slag bath is arranged in the vicinity of the slag feed. The lance generates a circulating flow above the slag bath. Following the afterburning zone, a metal bath sump zone is formed for reacting the metal bath with the slag bath. Next, a settling zone is formed, from which the hot combustion gases and the slag melt are drawn off.

10 Claims, 2 Drawing Sheets

PROCESS FOR WORKING UP COMBUSTION RESIDUES

BACKGROUND OF THE INVENTION

1. Field of the Invention

The invention relates to a process for working up combustion residues and slags, respectively, from waste incineration plants or steel works slags in a converter by reacting the molten slag with a metal bath while injecting carbon and oxygen into the metal bath.

2. Description of the Related Art

Processes for working up slags by reaction with a metal bath have already been proposed, the successful reduction of metallic portions from the slags having been feasible in that way. In the processes proposed so far, the reduction potential of the metal bath was controlled by suitable measures, the blowing in of carbon while simultaneously blowing in oxygen through submerged tuyeres having been suggested therefor in the first place.

Yet, a relatively high dust emission rate and hence relatively high iron losses were observed in respective tests. In conventionally operating the proposed processes, converter emissions ranging between 10 and 15% by weight of the total converter contents were determined, thus calling for considerable expenditures in the subsequent purification of offgases.

Apart from the relatively high iron losses, it has been found that the economy of the process may be substantially enhanced only if it is feasible to minimize the demand of carbon and oxygen and to increase its thermal efficiency.

SUMMARY OF THE INVENTION

The invention aims at further developing a process of the initially defined kind with a view to substantially reducing the demand of carbon and oxygen while simultaneously lowering the converter emission rate. To solve this object, the process according to the invention essentially resides in that the converter is subdivided into three adjacent openly communicating zones. An afterburning zone including at least one lance for afterburning directed onto the slag bath is arranged in the vicinity of the slag feed, via which lance a circulatory flow is built up above the slag bath. Following the afterburning zone, a metal bath sump zone is formed for reacting the metal bath with the slag. After the metal bath sump zone a settling zone is formed, from which the hot combustion offgases and the slag melt are drawn off. Due to the configuration according to the invention, i.e., the afterburning zone being in open communication with the reduction zone above the metal bath and with the settling zone, it is feasible by suitable flow formation to maintain a high degree of circulation of slag particles in the afterburning zone and, at the same time, increase the thermal efficiency. The circulation of floating particles in the afterburning space prevents such particles from being drawn off via the gas space above the settling zone, since the particles are constantly recirculated onto the surface of the slag melt. Therefore, the process according to the invention advantageously is carried out so that the lances opening into the afterburning space are designed as water-cooled lances each having a Laval nozzle attached thereto. The circulatory flow of the particle stream centered about the axis of the lance is adjusted, via an injector effect, above the slag bath by aid of the oxygen for afterburning top-blown onto the slag bath through the lances. The desired circulatory flow of the particle stream above the slag bath in the afterburning zone may be maintained and adjusted by means of the water-cooled lances with the Laval nozzles attached, wherein additional protection of the lance is ensured by the formation of a cap of slag drops on the lance head. The transfer of heat to the slag droplets falling back in an accelerated manner is thereby optimized, intensive heat transfer from the overheated slag droplets to the slag bath being ensured by maximum temperatures of about 2400° C. occurring in the afterburning zone. An extremely accelerated inverse flame impinges on the slag bath at a high impulse, thereby additionally increasing the transfer of heat. In addition to the substantial advantage of the lance being efficiently protected by means of a slag drop coating, the advantage of the refractory lining being stressed to a lesser degree is achieved at the same time. The circulated particles, in fact, do not reach the refractory lining, thus causing substantially less wear. The lance injector effect allows for the sucking in of dust and hot additives, which are conducted into the burning spot and are rapidly dissolved into the slag melt. Since the formation of iron droplets in the gas space can be largely avoided by means of the remaining process parameters, the reoxidation of iron and chromium or vanadium can also be prevented. By using oxygen, the gas load on the overall system is reduced and, in this way, also the dust load is lowered.

As mentioned above, the process according to the invention advantageously may be carried out so that filter dust from offgas purification of the converter offgases is recycled through the top-blowing lances. If filter dusts are used and such filter dusts have high contents of residual iron, the process may be carried out so that a partial amount of the filter dusts having high contents of residual iron are directly injected into the metal bath so as to render feasible the complete recovery of the iron originally discharged.

Further reduction of the load on the environment may be obtained in that the solids separated in a hot cyclone are recycled again. In doing so, the process advantageously is conducted in a manner that solids separated from the converter offgases in a hot cyclone are recycled into the afterburning space. Such a separate introduction of cooled solids in a manner axially parallel to the oxygen lance causes the solids to be sucked into the circulatory flow and thereby recycled into the slag bath to an efficient degree. Additives optionally desired for adjusting a desired slag viscosity or slag composition within the scope of the process according to the invention may be used for cooling the discharged solids and charged onto the slag together therewith. Advantageously, the process is carried out so that the converter offgases are cooled with additives, such as $Al_2O_3$, $SiO_2$ or slag granulates, in a floating-gas or fluidized-bed heat exchanger and subsequently are separated from the cyclone and returned onto the slag bath. The additives in the floating-gas heat exchanger may be charged in co-current, or in a fluidized-layer heat exchanger may be charged as cold additives having grain sizes of between 0.5 and 3.5 mm, cold additives as well as, if desired, cooled solids separated in the hot cyclone cooling the converter emissions abruptly. Converter emissions usually are still in largely liquid or pasty states, wherein a mixed dust is immediately formed with the desired additives at a temperature of about 750° C., which may be separated in a hot cyclone without any problem.

Both the addition of additives and the recycling of cooled solids separated from the cyclone allow for the temperature prevailing within the cyclone to be limited to 750° C., additives being advantageous, in particular, if highly chromium-containing steel slags are to be converted into highly liquid chromium-free synthetic blast furnace slags for the production of cement. It is feasible also in case of highly vanadium-containing steel slags to recover a concentrated vanadium alloy in the reduction zone, this alloy subsequently being slagged free of vanadium and ferrovanadium substantially free of carbon being recoverable.

In order to further enhance the degree of afterburning and hence the thermal efficiency, the process is advantageously conducted in a manner that a partial amount of the CO- and $H_2$-containing purified converter offgas is injected into the slag bath in the afterburning space through bottom tuyeres, wherein a particularly efficient temperature transfer may be obtained by operating the bottom tuyeres in the afterburning zone at a pressure of between 4 and 12 bars.

DESCRIPTION OF THE DRAWINGS

In the following, the invention will be explained in more detail by way of an exemplary embodiment suitable for carrying out the process according to the invention and schematically illustrated in the drawing, wherein.

DETAILED DESCRIPTION OF A PREFERRED EMBODIMENT OF THE INVENTION

Figure 1:
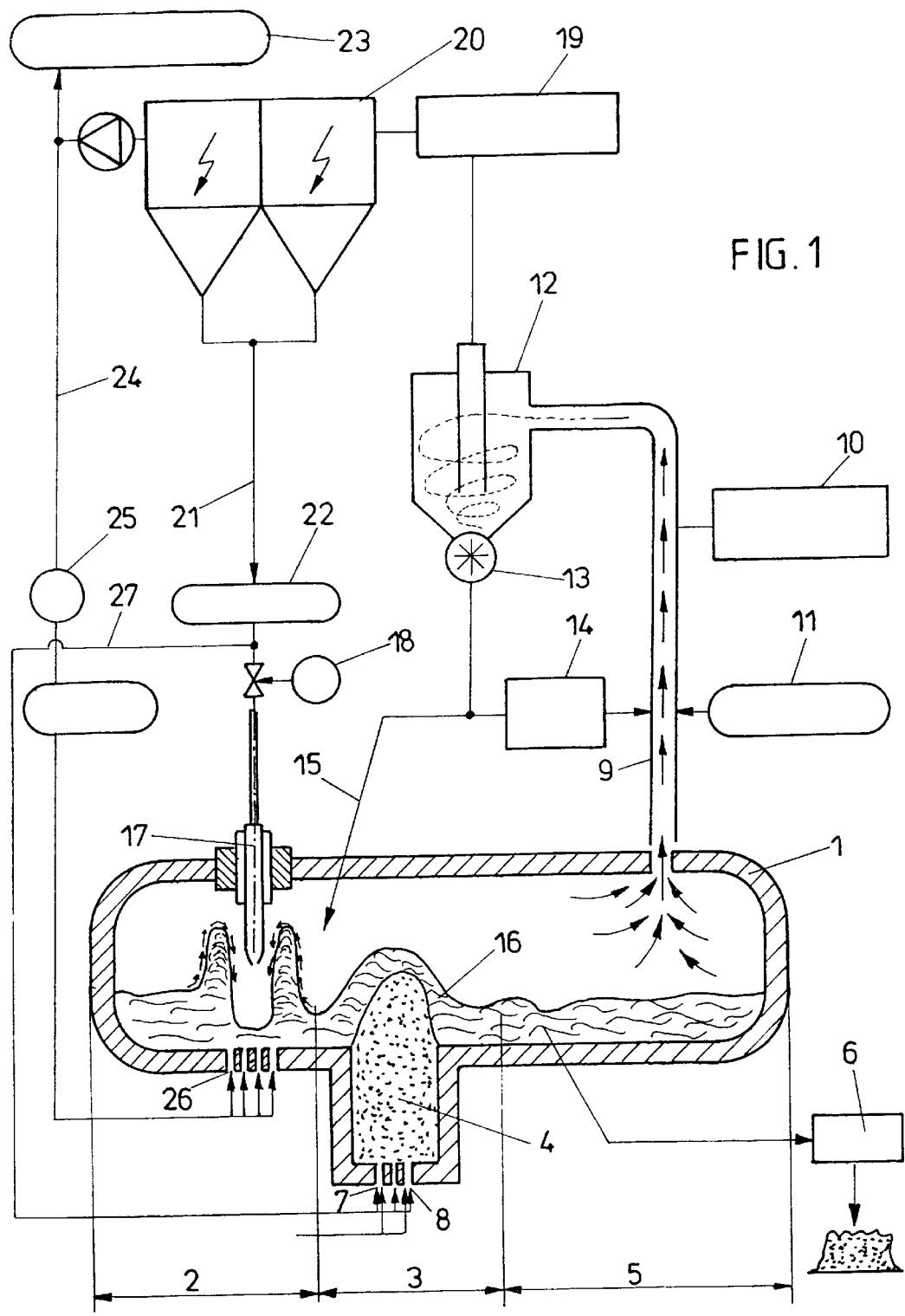
FIG. 1 is a schematic overall representation of the arrangement.

In FIG. 1, 1 serves to denote a converter designed as an iron bath reactor. The converter is subdivided into three zones, a first zone 2 serving afterburning and, hence, to improve the energy balance. In a consecutive zone 3 reduction takes place above an iron bath 4, following upon which a settling zone 5 is provided, from which the slag melt may be drawn off and supplied to granulation 6.

The iron bath 4 in the reduction zone is operated with carbon as well as oxygen, air, $CO_2$, water vapor and optionally methane fed through bottom tuyeres 7 and 8, whereby the reduction potential of the iron bath 4 may be adjusted accordingly. Depending on the starting composition of the slags and, in particular, on the chromium portion of these slags, the chromium content of the iron bath 4 is increased, so as to enable the recovery of ferro-chromium-carburé.

The hot offgases are removed from the settling zone 5 of the converter 1 at temperatures of about 1700° C. through a duct 9. The offgases are fed to a floating-gas heat exchanger 10, and there additives, in particular, $Al_2O_3$, $SiO_2$ or waste incineration slag granulates are charged from a hopper 11 after having been subjected to a first treatment. The fine particles contained in the offgas thereby are cooled to temperatures of about 750° C. and flow into a cyclone separator 12. The solids discharged from the cyclone separator 12 via a cellular wheel sluice 13 may be conducted through a returns cooler 14 and supplied to the floating-gas heat exchanger like the additives from the hopper 11. The solids subsequently are returned to the afterburning zone through a duct 15 and charged onto the molten steel slag. The steel slag is denoted by 16.

A water-cooled oxygen lance 17 opens into the afterburning space, oxygen being fed from an oxygen source 18.

Hot residual gases leave the cyclone separator 12, are initially conducted through a hot gas cooler 19 and, after this, are fed to a filter 20. The filter dust may be discharged through a duct 21 and collected in a reservoir 22. From this reservoir 22, the filter dust may be admixed to the oxygen of the oxygen lances and recycled into the afterburning zone of the converter 1. A considerable portion of the residual gas leaving the filter 20 may be fed to residual gas consumption 23, a high calorific value still being available due to the high portion of approximately 50% by vol. of CO and $H_2$ contained in the residual gas. A partial amount of this residual gas, via a duct 24 and a compressor 25 operated at a pressure of between 4 and 12 bars, is conducted to submerged tuyeres 26 opening into the slag bath 16 in the afterburning zone 2. Together with the oxygen injected through the oxygen lance 17, further combustion under intensive utilization of the thermal energy for heating the slag bath is feasible there. The filter 20 preferably may be designed as a sack or bag filter.

In case filter dust having a high iron content occurs, this highly iron-containing filter dust via a duct 27 may be supplied to the bottom tuyeres 7 and 8 provided below the iron bath 4 in order to thereby recover the metallic portion almost completely.

Figure 2:
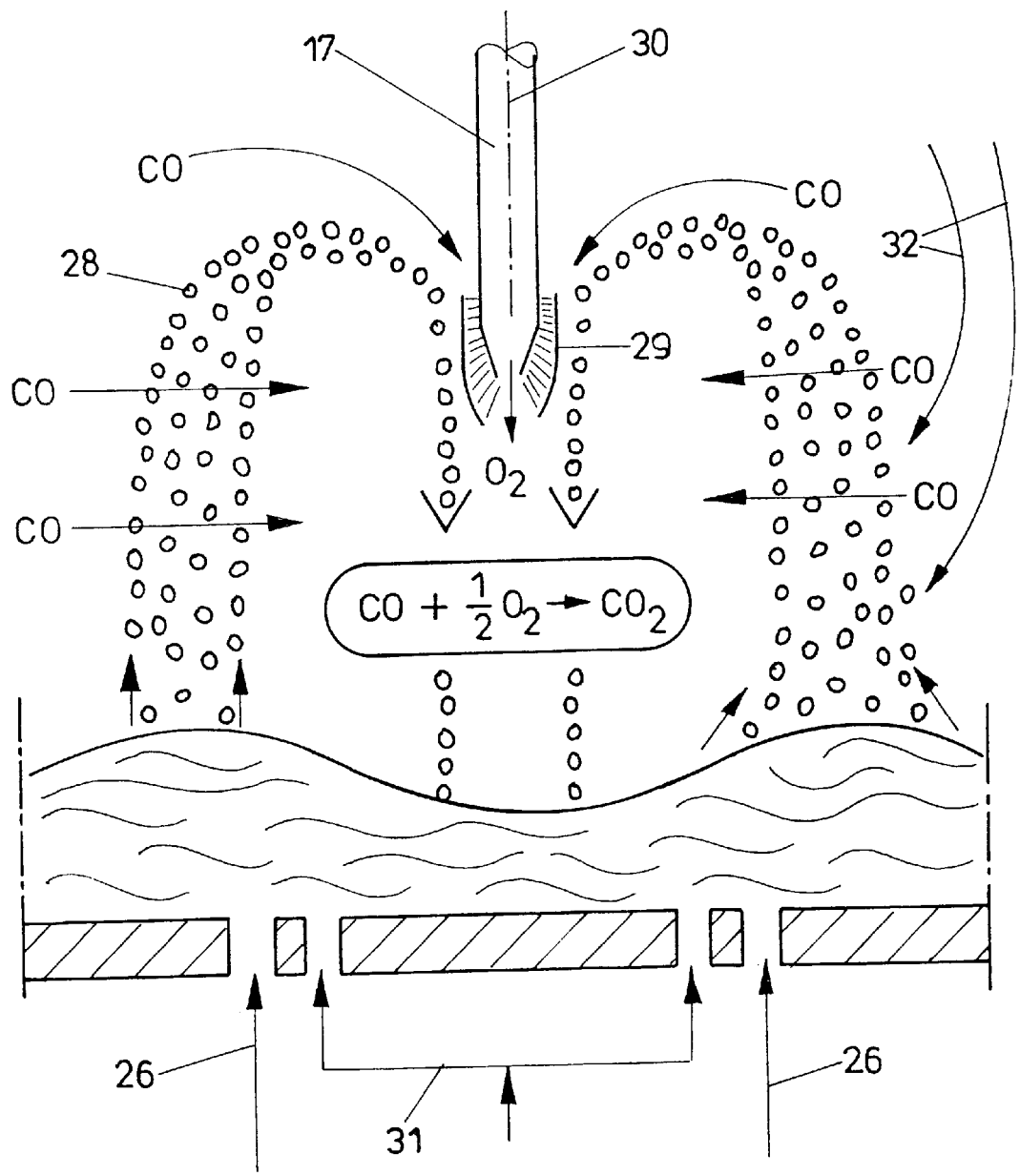
FIG. 2 is an enlarged illustration of the conditions resulting in the afterburning zone.

In FIG. 2 the flow conditions prevailing within the afterburning zone are illustrated. The water-cooled oxygen lance again is schematically indicated by 17, comprising a Laval nozzle on its mouth. The water-cooled lance, which is made of stainless steel, with its Laval nozzle attached projects into the densest region of the upwardly streaming slag particles, which are denoted by 28. A slag layer having a thickness of approximately 1 cm freezes to the water-cooled lance, thus constituting the optimum protection against temperature exposure and abrasion. This slag lap is schematically indicated by 29. The freely emerging oxygen stream produces an injector effect centering the slag particle stream in the direction towards the lance axis 30 with converter offgas being sucked in at the same time. Return gases and optionally slight amounts of carbon are again introduced through the bottom tuyeres 26, slight amounts of oxygen being additionally feedable via further bottom tuyeres 31. The slag melt, by aid of return gas, is dispersed into the afterburning space in the form of slag droplets by about 35% by weight through the high-pressure submerged tuyeres 26 and 31 provided in the afterburning space, what is feasible on account of particularly efficient afterburning by 35 to 60% of the CO and $H_2$ formed. The degree of afterburning is defined as follows:

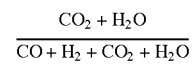

The afterburning heat is transferred to the slag particles by means of radiation and convection.

As is apparent from FIG. 1, the hot additives, as they are drawn off the gas space of the settling zone by recooling the floating substances, via duct 15 get into the afterburning space outside the axis 29 of the oxygen lance 17, streaming into the circulating gas and particle flow in the sense of arrows 32. The particles are incorporated in the circular stream and returned onto the slag bath, thereby ensuring the efficient reaction of the return stock and of the additives.

Corrosive particles and radiation heat are kept away from the refractory lining by the circulation prevailing in the afterburning space such that the service life of the refractory lining will be increased.

What I claim is:

1. A process for working up combustion residues and slags derived from waste incineration plants or steel works in a converter containing a metal bath and comprising an afterburning zone, a metal bath sump zone, and a settling zone, said process comprising:

introducing the combustion residues and slags into the afterburning zone of the converter, the afterburning zone including at least one afterburning lance directed onto a surface of slag melt comprising the combustion residues and slags to permit build up of a circulating flow of slag particles above the slag melt;

reacting the slag melt with the metal bath in the metal bath sump zone while injecting at least carbon and oxygen into the metal bath; and drawing off the slag melt and hot combustion offgases from the settling zone, wherein the metal bath sump zone is adjacent to and in open communication with both the afterburning zone and the settling zone to permit the hot combustion gases to circulate throughout each of the zones of the converter and thereby assist in maintaining the slags in a molten state.

2. The process of claim 1, wherein the afterburning lance is a water-cooled lance which opens into the afterburning zone, has a lance axis, and comprises a Laval nozzle, and wherein said process further comprises adjusting a circulatory flow of a stream of the slag particles so as to be centered about the lance axis above the slag melt, via an injector effect, with aid of oxygen for afterburning top-blown onto the slag melt through the afterburning lance.

3. The process of claim 1, further comprising purifying the combustion of gases drawn off from the settling zone so as to obtain purified offgases and filter dusts, and recycling the filter dust through the afterburning lance.

4. The process of claim 3, further comprising injecting a portion of the filter dusts having a high residual iron content directly into the metal bath.

5. The process of claim 1, further comprising providing a cyclone for separating solids from the hot combustion offgases drawn off from the settling zone and recycling the separated solids into the afterburning zone.

6. The process of claim 5, further comprising:

combining the hot combustion offgases drawn off from the settling zone with additives selected from the group consisting of $Al_2O_3$, $SiO_2$, and slag granulates;

cooling a stream comprising both the hot combustion offgases drawn off from the settling zone and the additives in a heat exchanger to form cooled converter offgases;

separating the cooled converter offgases from the cyclone; and recycling the separated cooled converter offgases onto the slag melt.

7. The process of claim 6, wherein the heat exchanger comprises a floating gas heat exchanger.

8. The process of claim 6, wherein the heat exchanger comprises a fluidized bed heat exchanger.

9. The process of claim 6, further comprising:

providing bottom tuyeres opening into the afterburning zone;

purifying the separated cooled converter offgases to form purified offgases; and injecting a portion of the purified offgases containing CO and $H_2$ into the slag melt through the bottom tuyeres opening into the afterburning zone.

10. The process of claim 9, further comprising operating the bottom tuyeres opening into the afterburning zone at a pressure of between 4 and 12 bars.

* * * * *